UNITED STATES PATENT OFFICE.

WILLSON H. ROWLEY, OF ST. LOUIS, MISSOURI.

PROCESS OF MAKING ELECTRODES.

1,156,316.  Specification of Letters Patent.  Patented Oct. 12, 1915.

No Drawing.  Application filed April 5, 1915. Serial No. 19,406.

*To all whom it may concern:*

Be it known that I, WILLSON H. ROWLEY, a citizen of the United States, and resident of St. Louis, Missouri, have invented certain new and useful Improvements in Processes of Making Electrodes, of which the following is a specification containing a full, clear, and exact description.

This invention relates to the process of applying and drying the lead oxid, "paste" filler of active material to the grids or frames of electrodes or battery plates and has for its object to render the process more expeditious, economic and with a minimum of "waste" or loss in producing unmarketable electrodes.

It is well known in the art that in the "pasted" or "Faure" electrode or battery plate certain solutions, compounds or substances, such as ammonium sulfate, magnesium sulfate, sulfuric acid and the like, are employed in the making of the lead oxid paste or filler of active material, which serves to dilate the oxid particles or mass to further porosity or acceleration as well as to serve as a particle binding medium, and as a medium for cementing the paste or mass to the grid or plate.

By the employment of such solutions, compounds and substances in a paste filler having lead oxid as a base, certain deleterious, undesirable reactions occur, which are difficult to control.

The different lead oxids, with their variable characteristics, when mixed with solutions, compounds and the like named, produce a variety of formations from an open loose mass of high porosity to a compact, dense, concentrated mass of low porosity that react differently, certain formations being excessively active and of short life and other formations being slow, sluggish or stubborn to become active in an electrolyte. Then too in the drying methods in vogue wherein the paste filler is put to dry in a uniformly moist condition throughout, "checking" and "falling out" or dislodgment results from shrinkage of the filler. That is, there is separation in the mass as well as mass separation from its support.

Instead of employing with my lead oxid, to reduce it to paste form, such chemicals, solutions and compounds as are now employed in the art, I employ water, or when the nature of lead oxid used requires I employ any of the known accelerators or dilators such as sulfuric acid, ammonium sulfate and the like. However, with the more amorphous formations of the lead oxids as produced no dilating medium is necessary and the plain water is used simply to reduce it to paste form. This paste of a uniformly moist condition is then pasted to the grids, frames or plates, and while still moist their surfaces are placed against material of absorptive or bibulous qualities for the purpose of taking up the excess moisture from the surfaces. By preference I use a strip of cloth, between folds of which a number of pasted grids are placed and then subject this number of grids with the strip of cloth to pressure, which not only facilitates the absorptive action of the cloth but tends to more uniform distribution of the paste in the grid. If desired, this absorptive or bibulous material may be provided with a corrugated surface, to produce upon the paste an undulate surface which will have quicker action in the electrolyte, or I may produce an uneven surface of any ornate design on the paste by using the cloth and a die bearing in relief the design desired. The plates after having the excess moisture absorbed from their surfaces are then dipped or treated momentarily in a bath, preferably a sulfuric acid solution, which permeates or enters that portion of the paste, only, from which the moisture has been absorbed, and forms with such moisture ridden paste, when exposed to the atmosphere, a temporary compact layer, whose function is to sustain or support the paste in the grids or electrode frames preventing too rapid drying, thus withholding the paste against dislodgment from the frame as well as to obviate "checking", which ordinarily results from too rapid surface drying.

During the drying process the compact layer formed by the momentary dipping or treating in sulfuric acid solution, or other bath, is softened by an absorption of the acid in the body of the paste filler and hence the commercial electrode made in accordance with my process is free from "checks" and "fallen out" filler, and with a known and dependable electrolytic action.

I claim:

1. The process of making electrodes which consists in filling into the electrode plate active material in the form of paste, taking up, by absorption, the excess moisture from the surfaces only of the active material and applying pressure to expedite the absorption and to uniformly dispose the active material in the plate.

2. The method of making electrodes, which consists in, first, applying to a suitable frame, a paste comprising an oxid of lead, second, in partially eliminating the moisture from the surfaces only of the paste, third, treating the partially moist ridden surfaces to a bath of a solution of sulfuric acid, whereby to produce a compact layer which prevents too rapid drying of the paste obviating "checks" and falling of the paste from its frame.

3. The process of making electrodes, which consists in filling the electrode plate with active material in the form of paste, partially eliminating the moisture from the surfaces only of the active material and chemically treating the partially moist ridden surfaces to render them more compact than the remaining active material.

In testimony whereof, I have signed my name to this specification, in presence of two subscribing witnesses.

WILLSON H. ROWLEY.

Witnesses:
E. L. WALLAC
R. G. ORWIG.